United States Patent [19]

Nishizawa et al.

[11] Patent Number: 4,562,532
[45] Date of Patent: Dec. 31, 1985

[54] MAIN STORAGE CONFIGURATION CONTROL SYSTEM

[75] Inventors: Hiroshi Nishizawa, Kawasaki; Saburo Ando, Tokyo; Syuji Ito, Seki, all of Japan

[73] Assignee: Fujitsu Limited, Kawasaki, Japan

[21] Appl. No.: 381,554

[22] Filed: May 24, 1982

Related U.S. Application Data

[63] Continuation-in-part of Ser. No. 101,690, Dec. 10, 1979, abandoned.

[30] Foreign Application Priority Data

Dec. 13, 1978 [JP] Japan .................................. 53-154827

[51] Int. Cl.⁴ .............................................. G06F 13/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,902,163 | 8/1975 | Amdahl | 364/200 |
| 3,902,164 | 8/1975 | Kelley | 364/200 |
| 3,967,104 | 6/1976 | Brantingham | 364/900 |
| 3,972,028 | 7/1976 | Weber et al. | 364/200 |
| 4,004,278 | 1/1977 | Nagashima | 364/200 |
| 4,028,684 | 6/1977 | Divine et al. | 364/900 |
| 4,149,244 | 4/1979 | Anderson | 364/200 |
| 4,223,381 | 9/1980 | Rozell | 364/200 |
| 4,244,032 | 1/1981 | Oliver | 364/900 |
| 4,281,379 | 7/1981 | Austin | 364/200 |
| 4,320,453 | 3/1982 | Roberts et al. | 364/200 |
| 4,394,734 | 7/1983 | Norgren et al. | 364/200 |

Primary Examiner—James D. Thomas
Assistant Examiner—David Y. Eng
Attorney, Agent, or Firm—Staas & Halsey

[57] ABSTRACT

A data processing system provided with a main storage unit comprising: a main storage including a plurality of configuration units and a main storage controller for selecting one of the configuration units of the main storage and for controlling reading and writing of information with respect to the selected configuration unit; and a central processor unit. Configuration data from a configuration unit. Configuration data from a configuration data generation unit is written in a configuration data storage means and one of the configuration units of the main storage is selected in accordance with the configuration data read from the configuration data storage means and in accordance with an address from the central processor unit so that the selected configuration unit is accessed.

3 Claims, 8 Drawing Figures

FIG. 2

| ADDRESS | | | RAM CONTENTS | | | | | | | | |
|---|---|---|---|---|---|---|---|---|---|---|---|
| 200 | 201 | 202 | 203 | 204 | 205 | 206 | 207 | 208 | 209 | 210 | |
| 0 | 0 | 0 | 1 | 0 | 0 | 0 | 0 | 0 | 0 | 0 | → 6 |
| 0 | 0 | 1 | 0 | 1 | 0 | 0 | 0 | 0 | 0 | 0 | → 7 |
| 0 | 1 | 0 | 0 | 0 | 1 | 0 | 0 | 0 | 0 | 0 | → 8 |
| 0 | 1 | 1 | 0 | 0 | 0 | 1 | 0 | 0 | 0 | 0 | → 9 |
| 1 | 0 | 0 | 0 | 0 | 0 | 0 | 1 | 0 | 0 | 0 | → 10 |
| 1 | 0 | 1 | 0 | 0 | 0 | 0 | 0 | 1 | 0 | 0 | → 11 |
| 1 | 1 | 0 | 0 | 0 | 0 | 0 | 0 | 0 | 1 | 0 | → 12 |
| 1 | 1 | 1 | 0 | 0 | 0 | 0 | 0 | 0 | 0 | 1 | → 13 |

FIG. 3

| ADDRESS | | | RAM CONTENTS | | | | | | | | |
|---|---|---|---|---|---|---|---|---|---|---|---|
| 200 | 201 | 202 | 203 | 204 | 205 | 206 | 207 | 208 | 209 | 210 | |
| 0 | 0 | 0 | 0 | 0 | 0 | 0 | 0 | 0 | 0 | 1 | → 13 |
| 0 | 0 | 1 | 0 | 0 | 0 | 0 | 0 | 0 | 1 | 0 | → 12 |
| 0 | 1 | 0 | 0 | 0 | 0 | 0 | 0 | 1 | 0 | 0 | → 11 |
| 0 | 1 | 1 | 0 | 0 | 0 | 0 | 1 | 0 | 0 | 0 | → 10 |
| 1 | 0 | 0 | 0 | 0 | 0 | 1 | 0 | 0 | 0 | 0 | → 9 |
| 1 | 0 | 1 | 0 | 0 | 1 | 0 | 0 | 0 | 0 | 0 | → 8 |
| 1 | 1 | 0 | 0 | 1 | 0 | 0 | 0 | 0 | 0 | 0 | → 7 |
| 1 | 1 | 1 | 1 | 0 | 0 | 0 | 0 | 0 | 0 | 0 | → 6 |

MAIN STORAGE CONFIGURATION CONTROL SYSTEM

CROSS REFERENCES TO RELATED APPLICATIONS

This is a continuation-in-part of application U.S. Ser. No. 101,690 filed Dec. 10, 1979, now abandoned and is related to U.S. application Ser. No. 381,650, now abandoned.

BACKGROUND OF THE INVENTION

1. Field of the Invention

This invention relates to a main storage configuration control system, and more particularly to a main storage configuration control system for a data processing system in which a main storage unit, which comprises a main storage and a main storage controller, is combined with a central processor unit. The main storage comprises a plurality of configuration units from and in which storage information is simultaneously read and written.

2. Description of the Prior Art

In a system in which the main storage comprises a plurality of configuration units, an arrangement that permits free selection of each configuration unit is required. To this end, it is customary in the prior art to provide, in the main storage controller, an address translation circuit, formed by a switching circuit or jumper circuit, for translation of an address bit. A circuit for decoding the address after this translation is provided to determine which one of the configuration units is activated. In the alternative, an arrangement which holds an address to be accessed for each configuration unit and compares it with an address from the central processor unit and activates the configuration unit whose address coincides with that from the central processor unit, may be employed. Such a coventional method, however, involves the use of the address translation circuit, the configuration selector circuit or the address comparator for each configuration unit, and hence greatly affects the performance and reliability of the data processing system.

SUMMARY OF THE INVENTION

It is an object of the present invention to provide a main storage configuration control system in which a reloadable random access storage element, which receives an address from the central processor unit and outputs a configuration data signal, is provided in the main storage controller of the main storage. Configuration data is outputted using the storage element, thereby overcoming the above-mentioned defects of the prior art.

Briefly stated, according to the present invention, in a main storage configuration control system for a data processing system having a main storage unit combined with a central processor unit, the main storage unit comprises a main storage and a main storage controller and the main storage comprises a plurality of configuration units. The configuration units perform simultaneous storage information read-write operations. A reloadable configuration RAM for generating configuration data in accordance with an address from the central processor unit and a configuration RAM controller for controlling write configuration data from a configuration data generation unit, are provided. Configuration data generation unit is outside the main storage unit. The configuration data is read from the configuration RAM in accordance with an address from the central processor unit. Under the control of the configuration controller, the configuration data is written in the configuratio RAM and read therefrom to access the main storage.

BRIEF DESCRIPTION OF THE DRAWINGS

FIGS. 2 and 3 are tables explaining the stored content of a configuration RAM;

DESCRIPTION OF THE PREFERRED EMBODIMENTS

Figure 1:
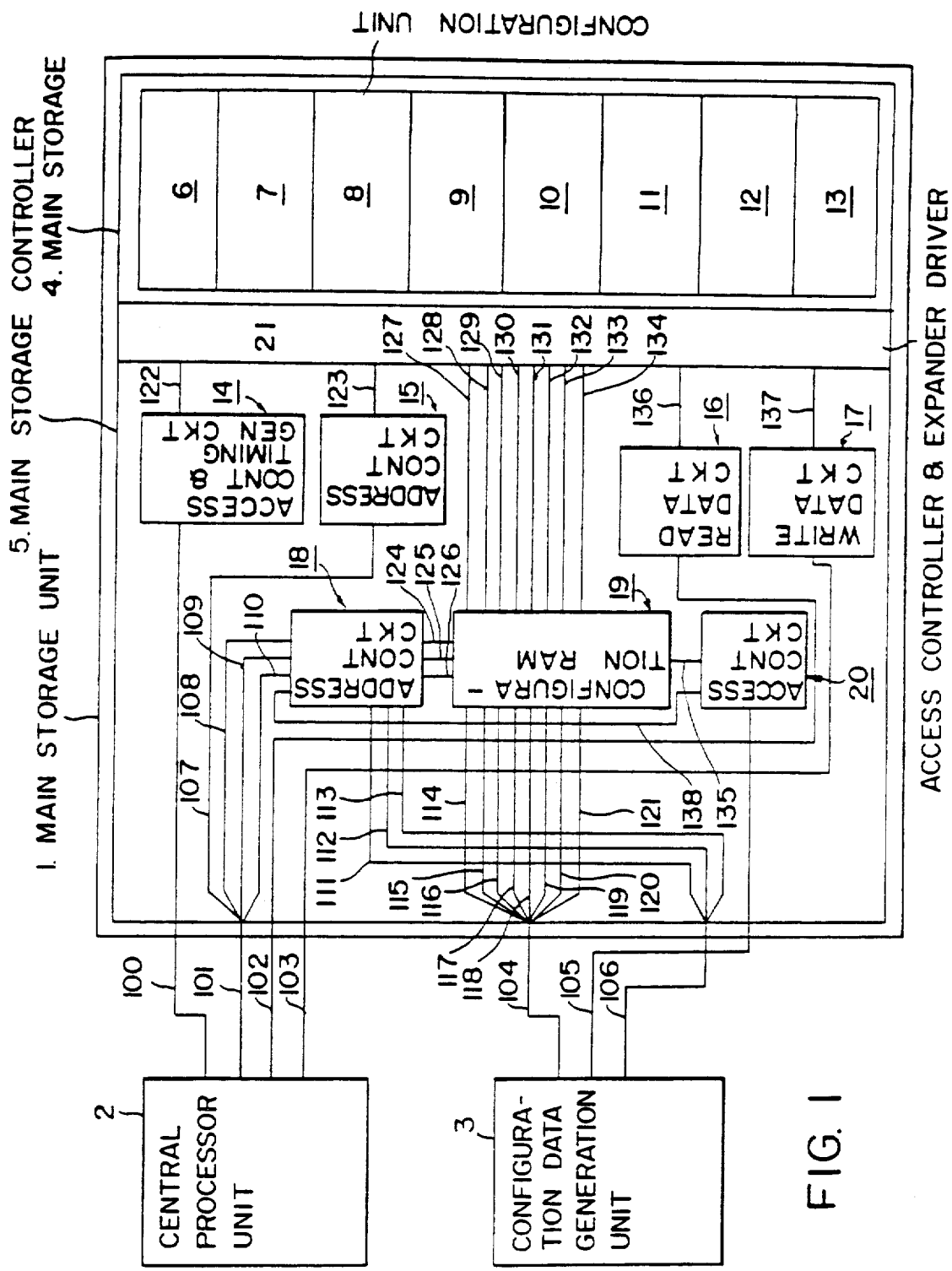
FIG. 1 is a block diagram illustrating an embodiment of this invention.

In FIG. 1 as illustrated in block form is an embodiment of this invention. Reference numeral 1 indicates a main storage unit; 2 designates a central processor unit; 3 identifies a configuration data generation unit; 4 denotes main storage; 5 represents a main storage controller; 6 to 13 show first to eighth configuration units; 14 refers to an access control and timing generator circuit; 15 indicates an address control circuit; 16 designates a read data circuit; 17 identifies a write data circuit; 18 denotes a configuration RAM address control circuit; 19 represents a configuration RAM; 20 shows a configuration RAM access control circuit; 21 refers to an access controller and expander driver; 100 indicates a main storage access request bus; 101 designates a main storage address bus; 102 identifies a main storage read data bus; 103 denotes a main storage write data bus; 104 represents a configuration data bus; 105 shows a configuration RAM access control bus; 106 refers to a configuration RAM write address bus; 107 indicates a main storage address bus; 108 to 110 designate first to third main storage configuration unit select addresses; 111 to 113 identify first to third configuration RAM write addresses; 114 to 121 denote first to eighth configuration data for the configuration RAM; 122 represents a storing timing bus; 123 shows a configuration unit address bus; 124 to 126 refer to first to third configuration RAM addresses; 127 to 134 indicate first to eighth configuration unit select signals; 135 designates a configuration RAM access control signal; 136 identifies a configuration unit read data bus; 137 denotes a configuration unit write data bus; and 138 represents a configuration RAM address control signal.

The main storage 4 of the main storage unit 1 has the first to eighth configuration units 6 to 13, and the configuration RAM 19 has an 8 word-8 bit configuration.

Between the main storage unit 1 and the central processor unit 2 there are provided the main storage access request bus 100 for requesting a write or read, the main storage address bus 101 for transferring an address of an access request, the main storage read data bus 102 for transferring data read from the storage unit 1 and the main storage write data bus 103 for transferring data to be written in the main storage unit 1. In the main storage controller 5 of the main storage unit 1, upon reception of the access request on the main storage access request bus 100, the access control and timing generator circuit 14 generates on the storage timing bus 122 a timing signal necessary for the main storage 4 and supplies it to the access controller and expander driver 21. The address control circuit 15 takes therein via the main storage address bus 107 that part of an address in the main storage address bus 101 which is required in the configuration unit to be selected, and supplies that address part to the access controller and expander driver 21.

Meanwhile, either the first to third main storage configuration unit select addresses 108 to 110 in the main storage address bus 101 or the first to third configuration RAM write addresses 111 to 113 from the configuration data generation unit 3 are selected by the configuration RAM address control circuit 18 and used as first to third configuration RAM addresses. This selection is performed by the configuration RAM address control signal 138 which is produced by the configuration RAM access control circuit 20 in accordance with a signal on the configuration RAM access control bus 105.

The configuration RAM 19 has an 8 word-8 bit configuration, and the first to eighth configuration data signals 114 to 121 for the configuration RAM are produced by the configuration data generation unit 3 and supplied via the RAM configuration data bus 104. The first to eighth configuration unit select signals 127 to 134 derived from the configuration RAM 19 are each sent to the access controller and expander driver 21, as a signal for selecting one of the eight configuration units of the main storage 4, to activate the configuration unit.

Write data sent to the main storage 4 is sent from the central processor unit 2 via the write data bus 103 to the write data circuit 17 and thence to the selected configuration unit via the configuration unit write data bus 137 and the access controller and expander driver 21. Data read from the selected configuration unit is sent via the configuration unit read bus 136 to the read data circuit 16 and thence to the central processor 2 via the main storage read data bus 102.

FIGS. 2 and 3 show examples of stored contents of the configuration RAM 19. In FIGS. 2 and 3, reference numerals 200 to 202 indicate address bits, which correspond to bits on the signal buses 108 to 110 and 111 to 113 in FIG. 1, and 203 to 210 designate data bits, which correspond to bits on the signal buses 114 to 121 and 127 to 134. In the access to the main storage, when the address is, for example, "000", the data bit 203 is "1" in the example of FIG. 2, so that the first configuration unit 6 in the main storage 4 is selected; in the example of FIG. 3, the data bit 210 is "1", so that the eighth configuration unit 13 in the main storage 4 is selected. The contents of the configuration RAM 19 can be reloaded arbitrarily by the control of the configuration data generation unit 3, as mentioned previously.

Figure 4:
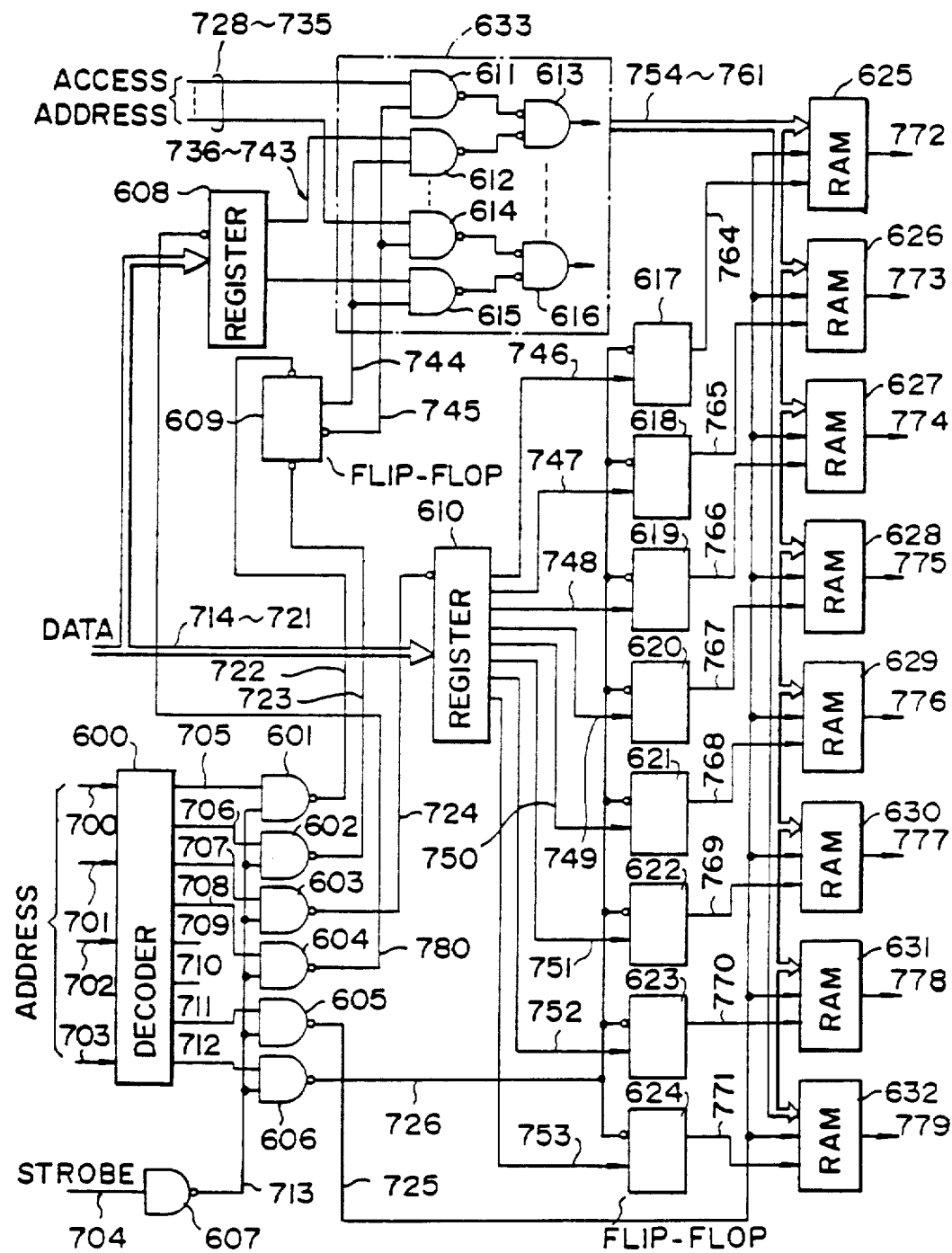
FIG. 4 is a block diagram illustrating a configuration RAM address controller, a configuration RAM and a configuration RAM access control circuit for use in this invention.

FIG. 4 shows in block form the configuration RAM address control circuit 18, the configuration RAM 19 and the configuration RAM access circuit 20. In FIG. 4, reference numeral 600 indicates a decoder; 601 to 607 designate NAND gates; 608 identifies an 8-bit register; 609 denotes a set-reset flip-flop; 610 represents an 8-bit register; 611 to 616 show NAND gates forming a multiplexer 633; 617 to 624 refer to edge-trigger flip-flops; 625 to 632 indicate RAM's, each having a storage capacity of 256 words × 1 bit, which constitute the principal part of the configuration RAM; and 700 to 780 designate various signals.

The data 714 to 721 from the configuration data generation unit 3 respectively correspond to the first to third configuratio RAM write addresses 111 to 113 and the first to eighth configuration data signals 114 to 121 in FIG. 1 and are indicated by separate signal buses in FIG. 1 for convenience of description, but in practice, these data are transferred on a time-shared basis via the signal bus shown in FIG. 4.

A description will be given first of the address setting. From the configuration data generation unit 3, the data 714 to 721 are transferred as configuration RAM write addresses to the register 610 and "1101" is transferred as the addresses 700 to 703 to the decoder 600 and a strobe pulse 704 is applied to the NAND gate 607. The decoder 600 operates in accordance with the fact that the address 703 is "1" and the output signal 708 from the NAND gate 604 is applied to the register 608 to set therein the data 714 to 721.

Next, the addresses 700 to 703 becomes "0001" and the output signal 705 of the decoder 600 becomes "1". Further, the strobe pulse 704 is provided, by which the output signal 722 of the NAND gate 601 is applied as a set signal to the flip-flop 609 which serves as an address control register. By setting of the flip-flop 609, the signals 744 and 745 become "1" and "0" respectively. Consequently, the multiplexer 633 outputs the output signals 736 to 743 of the register 608 as the address 754 to 761 to the RAM's 625 to 632.

Then, data to be written in the RAM's 625 to 632 are transferred as the data 714 to 721 and "0101" is transferred as the data 700 to 703, making the output signal 707 of the decoder 600 "1". By the application of the strobe pulse 704, the output signal 724 of the NAND gate 603 is provided as a set signal to the register 610 to set therein the data 714 to 721.

Thereafter, the addresses 700 to 703 become "1111" and the output signal 712 from the decoder 600 become "1". By the application of the strobe pulse 704, the output signal 726 of the NAND gate 606 is applied as a clock pulse to each of the flip-flops 617 to 624. As a consequence, the data 714 to 721 set in the register 610 are set as the data 764 to 753 in the flip-flops 617 to 624, whose set outputs 764 to 771 are provided to the RAM's 625 to 632.

Next, the addresses 700 to 703 are rendered into "0111" and the output signal 711 of the decoder 600 becomes "1", and by the application of the strobe pulse 704, the output signal 725 of the NAND gate 605 becomes "0" and is applied as a write enable signal to each of the RAM's 625 to 632. As a result of this, write data which are the set outputs 764 to 771 of the flip-flops 617 to 624 are written into the RAM's 625 to 632 in accordance with the addresses 754 to 761 provided from the multiplexer 633.

By repeating the above operations, desired data are written in the RAM's 625 to 632. Upon completion of this write, the addresses 700 to 703 become "1001" and the output signal 706 of the decoder 600 becomes "1". Then, when the strobe pulse 704 is applied, the output signal 723 of the NAND gate 602 becomes "0" to reset the flip-flop 609, whose output signals 744 and 745 become "0" and "1", respectively. As a consequence, the multiplexer 633 outputs access addresses 728 to 735 as the addresses 754 to 761.

When the RAM's 626 to 632 are supplied with the addresses 754 to 761 as a result of the application of the access addresses 728 to 735, data previously written in the RAM's 625 to 632 are read therefrom as read data 772 to 779, which correspond to the first to eighth configuration unit select signals in FIG. 1 and become a signal for selecting one of the configuration units 6 to 13 of the main storage 4.

In the case of the main storage 4 having the eight configuration units 6 to 13, the configuration RAM is sufficient to have a 3-bit configuration, but the above embodiment is arranged so that a configuration unit select signal of 8 bits fronothe RAM's 625 to 632 may be outputted so as to provide for expansion of the configuration unit.

Figure 5:
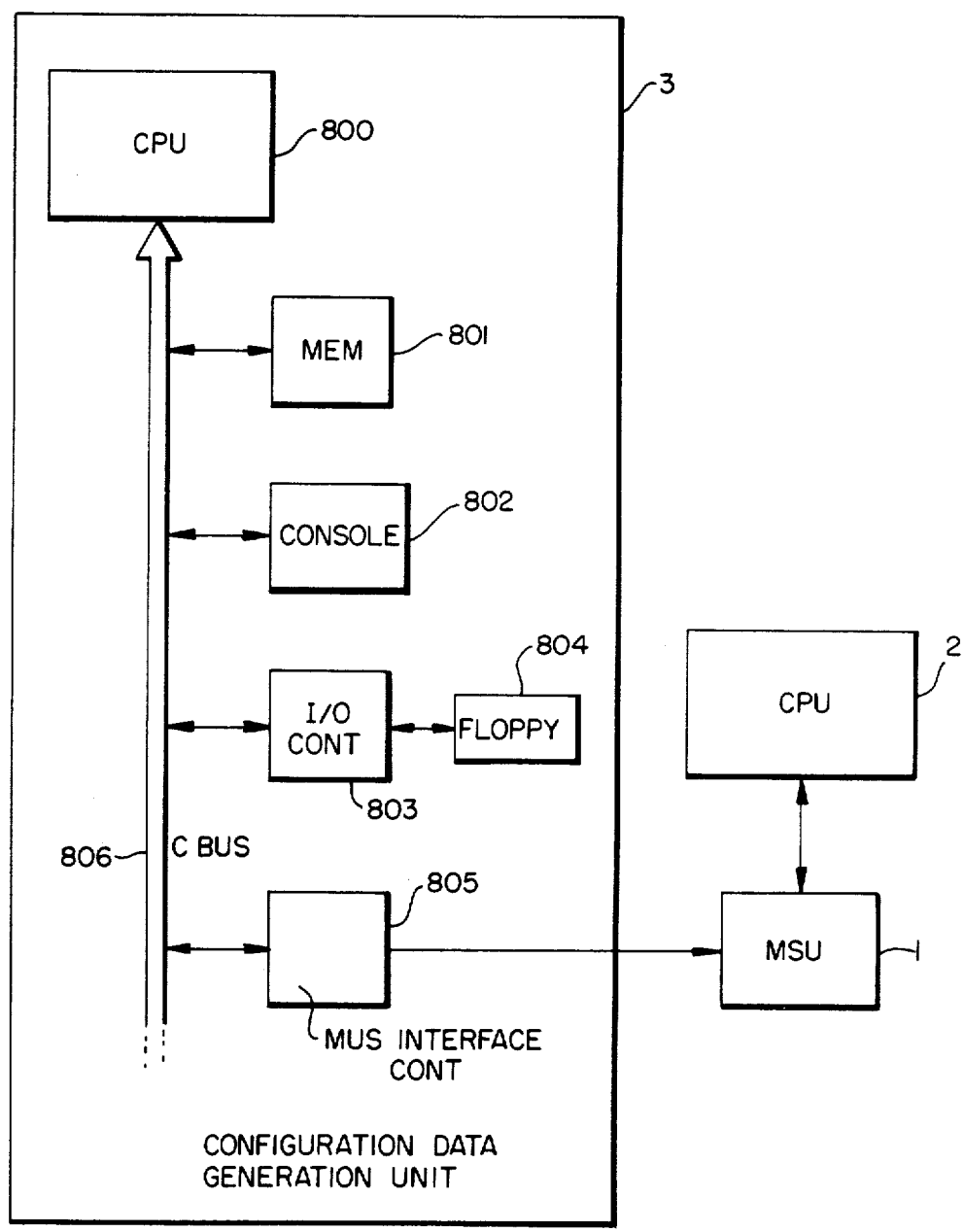
FIG. 5 is a block diagram illustraing the configuration data generation unit.

FIG. 5 is a block diagram of the configuration data generation unit 3. In FIG. 5, reference numeral 1 denotes a main storage unit; 2 a central processor unit; 3 a configuration data generation unit; 800 a configuration central processor unit; 801 a configuration processor memory; 802 a console; 803 an I/O controller; 804 a floppy disk; 805 a main storage unit interface controller; and 806 a bus line.

Figure 7:
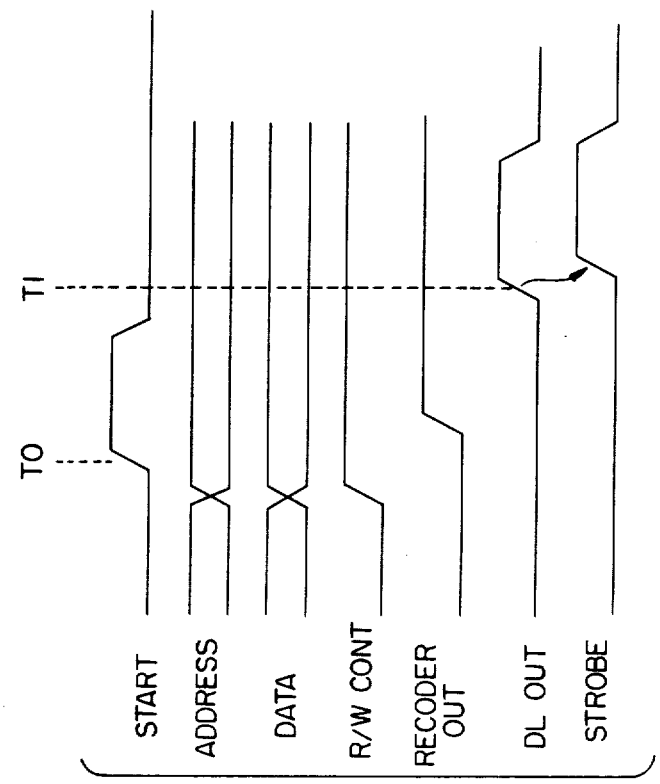
FIG. 7 is a time chart for the signals in the main storage unit interface controller.
Figure 6:
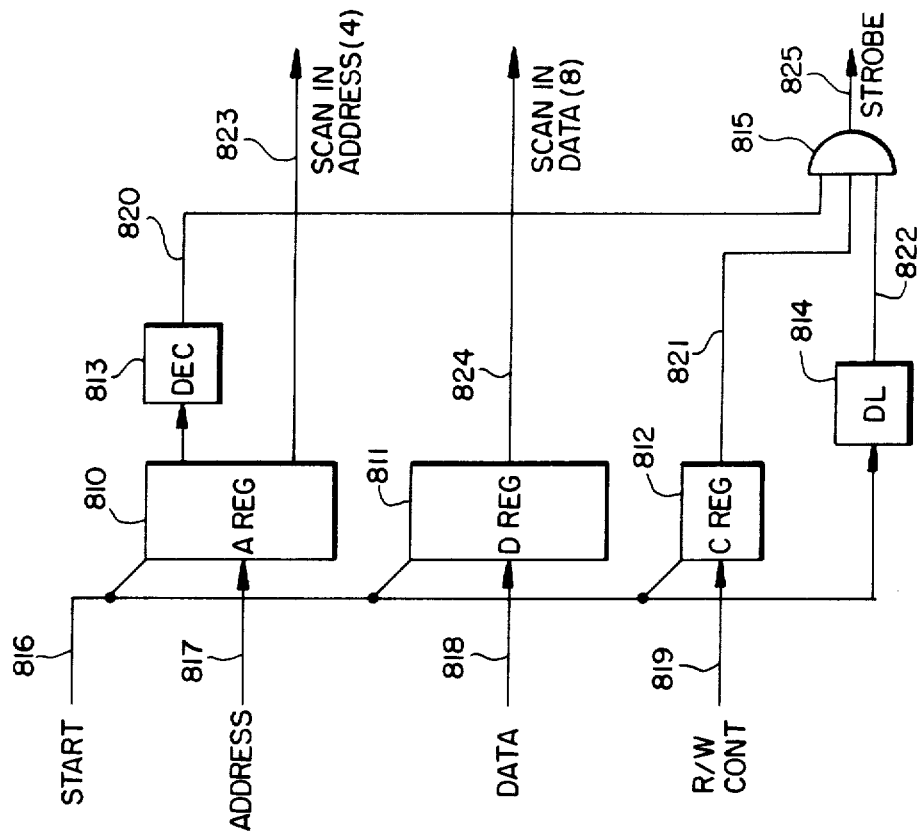
FIG. 6 is a detailed circuit diagram of the main storage unit interface controller.

FIG. 6 is a detailed view of the main storage unit interface controller 805 shown in FIG. 5. In FIG. 6, reference numerals 810 to 812 indicate registers; 813 a decoder; 814 a delay circuit; 815 an AND gate; 816 a start line; 817 an address line; 818 a data line; 819 an R/W control line; 820 a decoder output line; 821 an output line of the register 812; 822 an output line of the delay circuit 814; 823 a scan in address line; 824 a scan in data line; and 825 a strobe line. FIG. 7 is a time chart of the signals in the main storage unit interface controller 805 illustrated in FIGS. 5 and 6.

Figure 8:
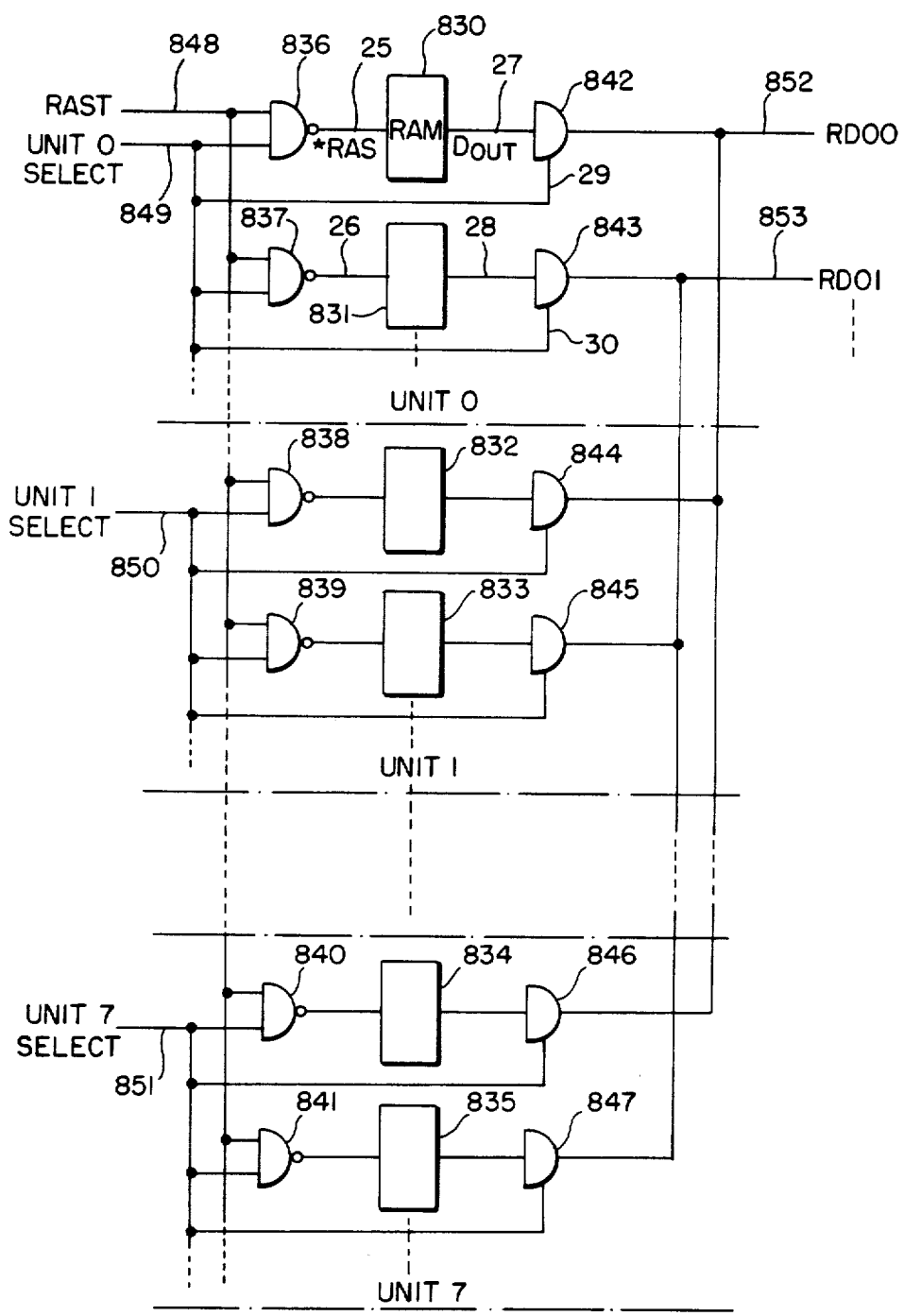
FIG. 8 is a detailed circuit diagram of the main storage configuration unit.

FIG. 8 is a detailed block diagram of the main storage configuration unit 1, wherein reference numerals 830 to 835 designate random access memory devices; 836 to 841 NAND gates; 842 to 847 tri-state gates; 848 a RAST signal line; 849 to 851 unit select signal line; and 852 and 853 read data lines.

The configuration data generation unit 3 is a system having the structure illustrated in FIG. 5 and which contains the configuration CPU 800 operating under program control. This unit is connected via the main storage unit interface controller 805 to the main storage unit 1, feeding thereto 4 address bits, data bits and strobe signals. The main storage unit interface contoller 805 has the structure illustrated in FIG. 6 and operates in such a manner that, when receiving a start signal from the configuration CPU 800, it sets or clocks in an address signal, a data signal and an R/W control signal (which assigns either the read or write mode, giving "1" for the write mode) in the respective registers 810–812 by means of the start signal. Part of the set address signal assigns the device address of the device connected to the C bus. This signal is decoded so that either selection or non-selection of a configuration unit is chosen. If selection is chosen and the write mode is assigned, the strobe signal is fed to the access controller 20 of the main storage unit 1 and the address and data signals are sent from the respective register 810 and 811 directly to the main storage unit 1.

Configuration data is written to the configuration RAM 625 to 635 by a write program loaded into the configuration CPU 800. The write program, when started, functions to prepare and write address and data signals into the configuration RAMs 625 to 635. When the system is turned on, the write program is started by a system initialization routine. Upon completion of the writing of the data the access from the CPU 2 to the main storage unit 4 is possible. A console 802 connected with the C bus is available when it is desired to modify the stored configuration data. The modified data is entered from the console 802.

FIG. 7 shows a time chart of the respective signals in the main storage unit interface controller 805 which are obtained when the configuration data generation unit 3 accesses the controller 20 of the main storage unit 1. After the address, data and R/W control signals become stable, a start signal rises at T0. When this signal rises, input data are set or clocked into the registers 810 to 812 of the main storage unit interface controller 805. If select is chosen the decoder 813 provides an output "1", and if the R/W controller assigns the write mode, the C register 812 also provides an output "1". The start signal is delayed by the delay line 814 to T1 and entered into the AND gate 815 at this time. An output 825 of the AND gate 815 is fed as a strobe signal to the main storage unit 1.

The selection of the main storage configuration unit by configuration RAM data is now described.

FIG. 8 illustrates an example of the main storage configuration units 6–13 where each comprise dynamic random access memories. In addition to the signals *RAS and $D_{OUT}$, the memory device (RAM) used includes signals *CAS, *WE, $D_{IN}$ and address signal lines, but only the signals referred to herein are shown in the Figure.

At access from the CPU 2, an address signal being supplied causes an 8-bit configuratin unit select signal to be read out of the configuration RAM 19. The 8-bit data contains "1" only in the bit correspoinding to the selected unit and "0" in all the other seven bits (see FIGS. 2 and 3). As shown in FIG. 8, the eight bits are entered into the respective units as unit select signals 0 to 7 on respective unit select lines and are used as a gate signal for the *RAS signal to the RAM memory device (830 to 835) and as an output control signal of the read data output gate (842 to 847) (tri-state). Prevention of entry of the *RAS signal to the RAM memory device of the non-selected unit by the *RAS signal gate leads to non-operation of the memory device. Read data from the unit selected by the read data output control is sent to the main storage controller 5.

An occasion when the data is read from unit 0 is describes in the following. At access from the CPU 2, an address signal being supplied causes an 8-bit configuration unit select signal to be read out of the configuration RAM 19. If unit 0 is selected, only the unit 0 select line of FIG. 8 becomes "1". The RAST signal 848 supplied from the timing generate circuit 14 (FIG. 1) is sent via NAND gates 836 and 837 to RAMs 830 and 831 as *RAS and read. The *RAS signal does not enter the other seven units which have a "0" unit select signal on the respective unit select lines, and, accordingly, those RAMs do not operate. Read data 27 and 28 are entered into tri-state gates 842 and 843, which are opened because the output controls 29 and 30 are "1". The resulting outputs are RD00 (852) and RD01 (853). Since the tri-state gates of the other units do not open, only the data read out of unit 0 is sent via the read data circuit 16 (FIG. 1) to the CPU 2. The write operation is similarly performed.

As has been described in the foregoing, according to this invention, in a data processing system employing a central data processor unit and a main storage unit in combination, a configuration RAM is used in a main storage controller, and a configuration data generation unit is provided outside the main storage unit for producing configuration RAM write information. An address from the central processor unit is used as an address input to the configuration RAM and output data therefrom is used as a main storage configuration unit select signal; therefore the main storage configuration and the main storage configuration unit selection can be achieved at the same time using only a small quantity of hardware.

While the present invention has been described with respect to a specific embodiment thereof, it is to be understood that the present invention is not limited thereto in any way but covers any and all changes and modifications which will become possible within the scope of the appended claims.

What is claimed is:

1. A main storage configuration control system for a data processing system having a central processor unit for providing a main storage address for a main storage unit comprising a main storage, including a plurality of memory units each having a memory address register, and a main storage controller for selecting one of the plurality of memory units and for controlling reading and writing of information with respect to the selected memory unit, said main storage address having higher and lower order portions, the lower order portion being used for addressing memory locations within each selected memory unit, the main storage configuration control system comprising:

configuration data generation means for generating plural units of configuration data, including:
  a configuration processing unit for generating the units of configuration data;
  a configuration memory, operatively connected to said configuration processing unit, for storing the configuration data;
  a console, operatively connected to said configuration processing unit and said configuration memory, for initiating generation of the configuration data; and
  a main storage unit interface controller, operatively connected to said configuration processing unit, said configuration memory and said console, for controlling transfer of said configuration data;

reloadable configuration unit select information storage means, included in the main storage controller and operatively connected to the memory units and to the central processor unit, for storing the units of configuration data and for outputting a memory unit selection signal in accordance with the higher order portion of the main storage address from the central processor unit and the configuration data; and configuration unit selection controller means, operatively connected to said main storage unit interface controller of said configuration data generation means, the central processor unit and said reloadable configuration unit select information storage means, for selectively controlling write-in of said configuration data from said configuration data generation means into said reloadable configuration unit select information storage means and for selectively controlling readout of one of the units of configuration data, as said memory unit selection signal, from said reloadable configuration unit select information storage means in accordance with the higher order portion of the main storage address from the central processor unit, so that one of the plurality of memory units is selected by the higher order portion of the main storage address and accessed by the lower order portions of the main storage address.

2. A main storage configuration control system according to claim 1, wherein said reloadable configuration units select information storage means comprises a random access memory.

3. A main storage configuration control system according to claim 1, wherein said configuration data generation means is also for generating a write address signal and wherein said configuration unit selection controller means comprises a multiplexer for providing one of said write address signal from said configuration data generation means and the address from the central processor unit to said reloadable configuration unit select information storage means.

* * * * *

UNITED STATES PATENT AND TRADEMARK OFFICE
CERTIFICATE OF CORRECTION

PATENT NO. : 4,562,532
DATED : December 31, 1985
INVENTOR(S) : HIROSHI NISHIZAWA ET AL.

It is certified that error appears in the above-identified patent and that said Letters Patent is hereby corrected as shown below:

Col. 1, line 38, "coventional" should be --conventional--.

Col. 2, line 5, "configuratio" should be --configuration--.

Col. 4, line 7, "configuratio" should be --configuration--.

Col. 5, line 13, "fronothe" should be --from the--.

Col. 6, line 32, "configuratin" should be --configuration--;

line 34, "correspoinding" should be --corresponding--;

line 48, delete "describes".

Col. 8, line 33, "units" should be --unit--.

Signed and Sealed this

Twenty-second Day of July 1986

[SEAL]

Attest:

DONALD J. QUIGG

Attesting Officer     Commissioner of Patents and Trademarks